United States Patent
Wang et al.

(10) Patent No.: US 6,814,593 B2
(45) Date of Patent: Nov. 9, 2004

(54) PORTABLE COMPUTER HAVING A COMMON CONNECTOR COUPLED TO A WIRELESS ANTENNA AND A MODEM CONNECTOR

(75) Inventors: Houk Wang, Seoul (KR); Kyun-hoe Park, Suwon (KR)

(73) Assignee: Samsung Electronics Co., Ltd., Suwon-si (KR)

(*) Notice: Subject to any disclaimer, the term of this patent is extended or adjusted under 35 U.S.C. 154(b) by 52 days.

(21) Appl. No.: 10/166,639

(22) Filed: Jun. 12, 2002

(65) Prior Publication Data

US 2003/0040206 A1 Feb. 27, 2003

(30) Foreign Application Priority Data

Aug. 21, 2001 (KR) ........................................ 2001-50453

(51) Int. Cl.[7] .............................................. H01R 13/44
(52) U.S. Cl. ...................................................... 439/131
(58) Field of Search ................................ 439/131, 955, 439/489, 946, 676

(56) References Cited

U.S. PATENT DOCUMENTS

| | | | |
|---|---|---|---|
| 5,592,528 A | | 1/1997 | Nelson et al. |
| 5,640,444 A | | 6/1997 | O'Sullivan |
| 6,059,583 A | | 5/2000 | Croft et al. |
| 6,226,529 B1 | * | 5/2001 | Bruno et al. ................. 455/557 |
| 6,419,506 B2 | * | 7/2002 | Jones et al. .................. 439/131 |
| 2001/0019907 A1 | * | 9/2001 | Glad et al. ................... 439/131 |

FOREIGN PATENT DOCUMENTS

| | | |
|---|---|---|
| JP | 8-191479 | 7/1996 |
| JP | 10-126839 | 5/1998 |
| WO | 90/13871 | 11/1990 |

* cited by examiner

*Primary Examiner*—J. F. Duverne
(74) *Attorney, Agent, or Firm*—Staas & Halsey LLP

(57) ABSTRACT

A portable computer having a main body provided with a modem signal processing part and a wireless network communication module includes an external antenna transmitting a radio signal for a wireless data communication with the wireless network communication module, an external modem connector transmitting a modem signal for a modem communication with the modem signal processing part, and a common connector coupling the external modem-connector to the modem signal processing part and the external antenna to the wireless network communication module. With this configuration, the portable computer has a good efficiency of a radio signal transmission and provides an installation space for another hardware components.

40 Claims, 6 Drawing Sheets

PORTABLE COMPUTER HAVING A COMMON CONNECTOR COUPLED TO A WIRELESS ANTENNA AND A MODEM CONNECTOR

CROSS-REFERENCE TO RELATED APPLICATIONS

This application claims the benefit of Korean No. 2001-50453, filed Aug. 21, 2001 in the Korean Industrial Property office, the disclosure of which is incorporated herein by reference.

BACKGROUND OF THE INVENTION

1. Field of the Invention

The present invention relates to a portable computer, and more particularly to a portable computer having a common connector coupled to either one of an external modem-connector and an external wireless antenna.

2. Description of the Related Art

A portable computer has mobility and simplicity compared to a desktop computer. The portable computer is collectively called a laptop computer, a notebook computer, a palmtop computer, PDA (personal digital assistants), etc.

Because of the mobility of the portable computer, the portable computer generally employs a wireless network communication system.

In the wireless network communication system, the portable computer requires a wireless network communication module, such as a wireless LAN (local area network) module, a Bluetooth module, etc. Further, the portable computer also requires a device which receives and transmits radio signals therethrough (hereinafter, the device will be referred to as an antenna).

Generally, in the conventional portable computer, an antenna 130 is internally provided in a main body 110 or in an LCD assembly 103 as shown in FIG. 1, or is externally attached to the main body 110 through an additionally provided antenna connector 141 as shown in FIG. 2.

However, as shown in FIG. 1, in a case where the antenna 130 is internally provided in the main body 110 or in the LCD assembly 103, the received and transmitted radio signals are affected by noise generated in the main body 110 and the LCD assembly 103, and an internal mechanical structure of the portable computer should be designed to accommodate an installation of the antenna 130. Further, as shown in FIG. 2, in a case where the antenna connector 141 is additionally provided in the main body 110, a production cost is increased, and an outside space of the main body 110, where other hardware components can be installed, is decreased because of the additional antenna connector 141.

SUMMARY OF THE INVENTION

Accordingly, it is an object of the present invention to provide a portable computer capable of reducing noise introduced in a wireless network communication, in which radio signals become relatively noiseless, and removing an additional device connecting an external antenna to a main body and occupying an outside space of the main body where other hardware components can be installed.

Additional objects and advantageous of the invention will be set forth in part in the description which follows and, in part, will be obvious from the description, or may be teamed by practice of the invention.

These and other objects of the present invention may be achieved by providing a portable computer having main body provided with a modem signal processing part and a Wireless network communication module, an external antenna through which a radio signal is transmitted for wireless data communication with the wireless network communication module, an external modem-connector through a modem signal is transmitted, and a common connector connecting the external modem-connector to the modem signal processing part and the external antenna to the wireless network communication module.

According to an aspect of the present invention, the external antenna includes a connector connection part detachably connected to the common connector, and the connector connection part includes a signal receiving and transmitting part receiving and transmitting the radio signal and a modem connection part provided in the connector connection part so as to insert the external modem-connector therein, and transmitting the modem signal from the external modem connector to the modem signal processing part of the main body through the common connector.

According to another aspect of the present invention, the common connector may include an RJ11 connector, and the external antenna may include at least one of a Bluetooth antenna and a wireless LAN antenna.

BRIEF DESCRIPTION OF THE DRAWINGS

These and other objects and advantageous of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
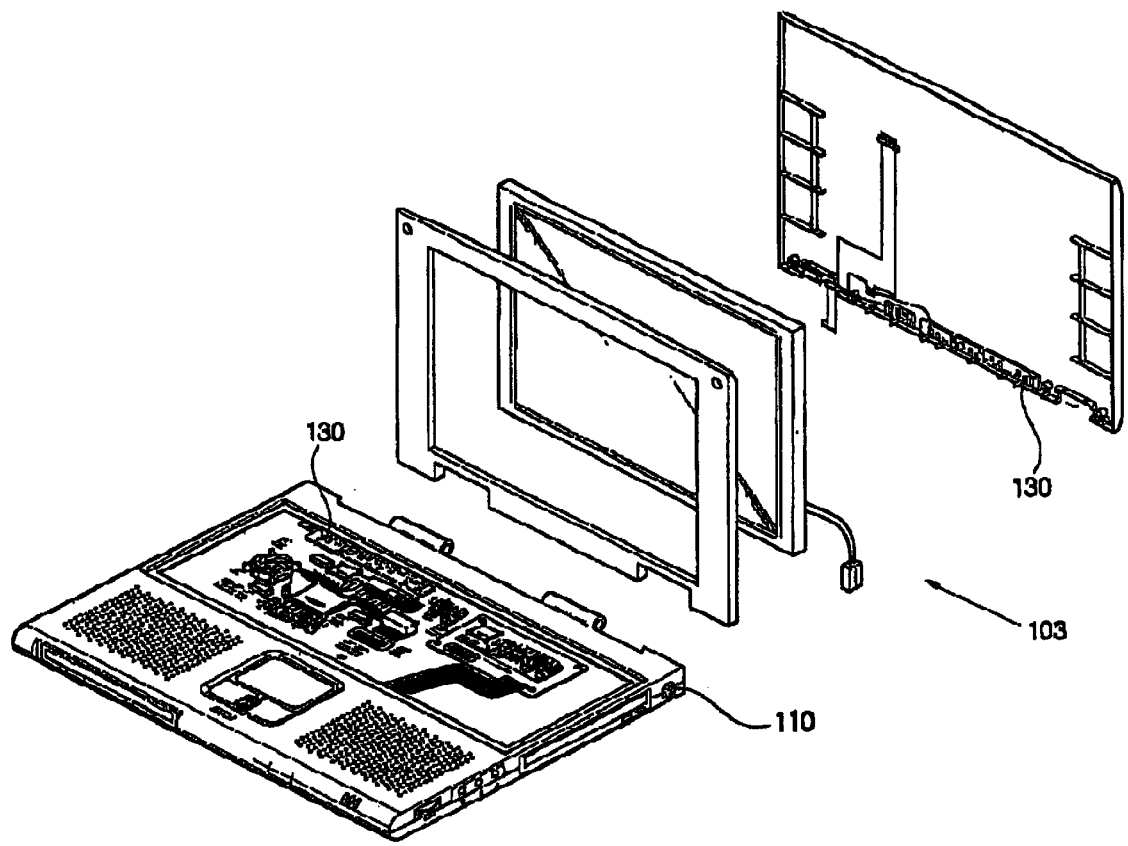
FIGS. 1 and 2 are perspective views of a conventional portable computer with a conventional antenna.

Reference will now be made in detail to the present preferred embodiments of the present invention, examples of which are illustrated in the accompanying drawings, wherein like reference numerals refer to the like elements throughout. The embodiments are described in order to explain the present invention by referring to the figures.

The present invention will be described in more detail with reference to the accompanying drawings. Herein, a portable computer is collectively called a laptop computer, a notebook computer, a palmtop computer, PDA (personal digital assistants), etc. By way of an example, the notebook computer will be described.

Figure 3:
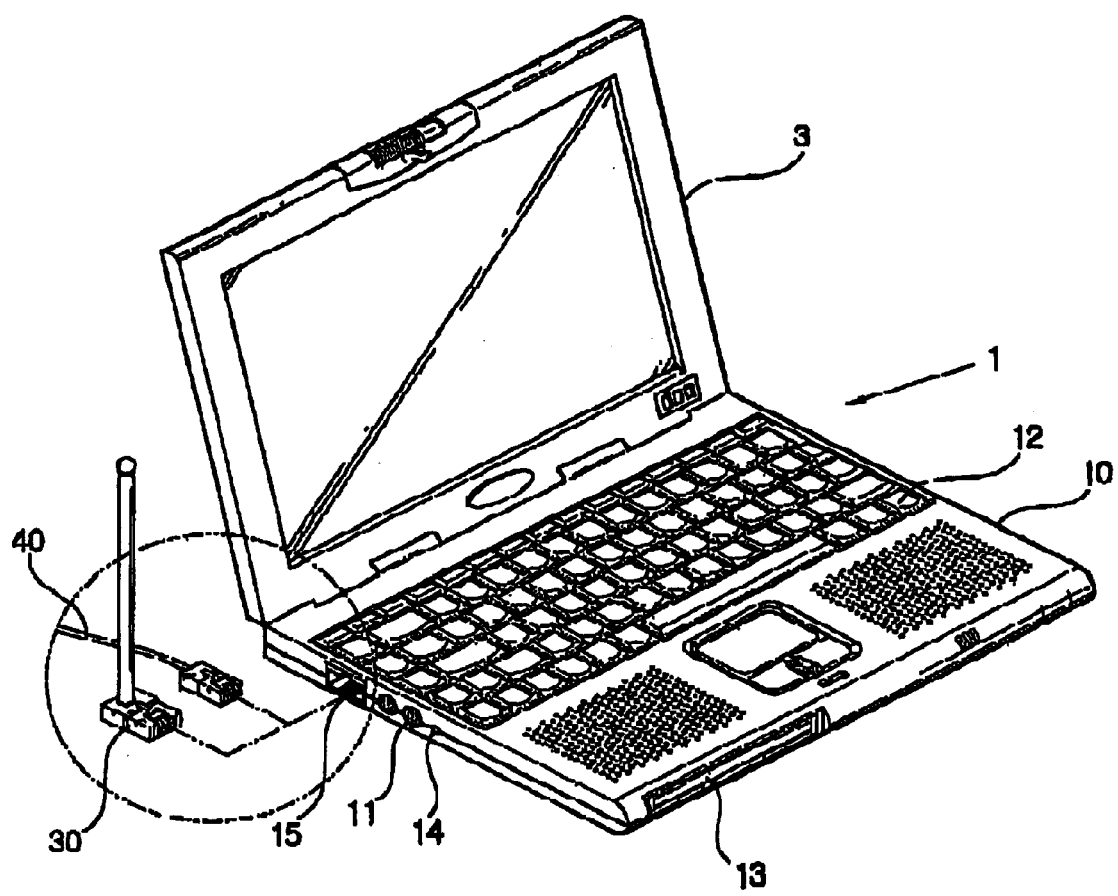
FIG. 3 is a perspective view of a notebook computer according to the present invention.
Figure 5:
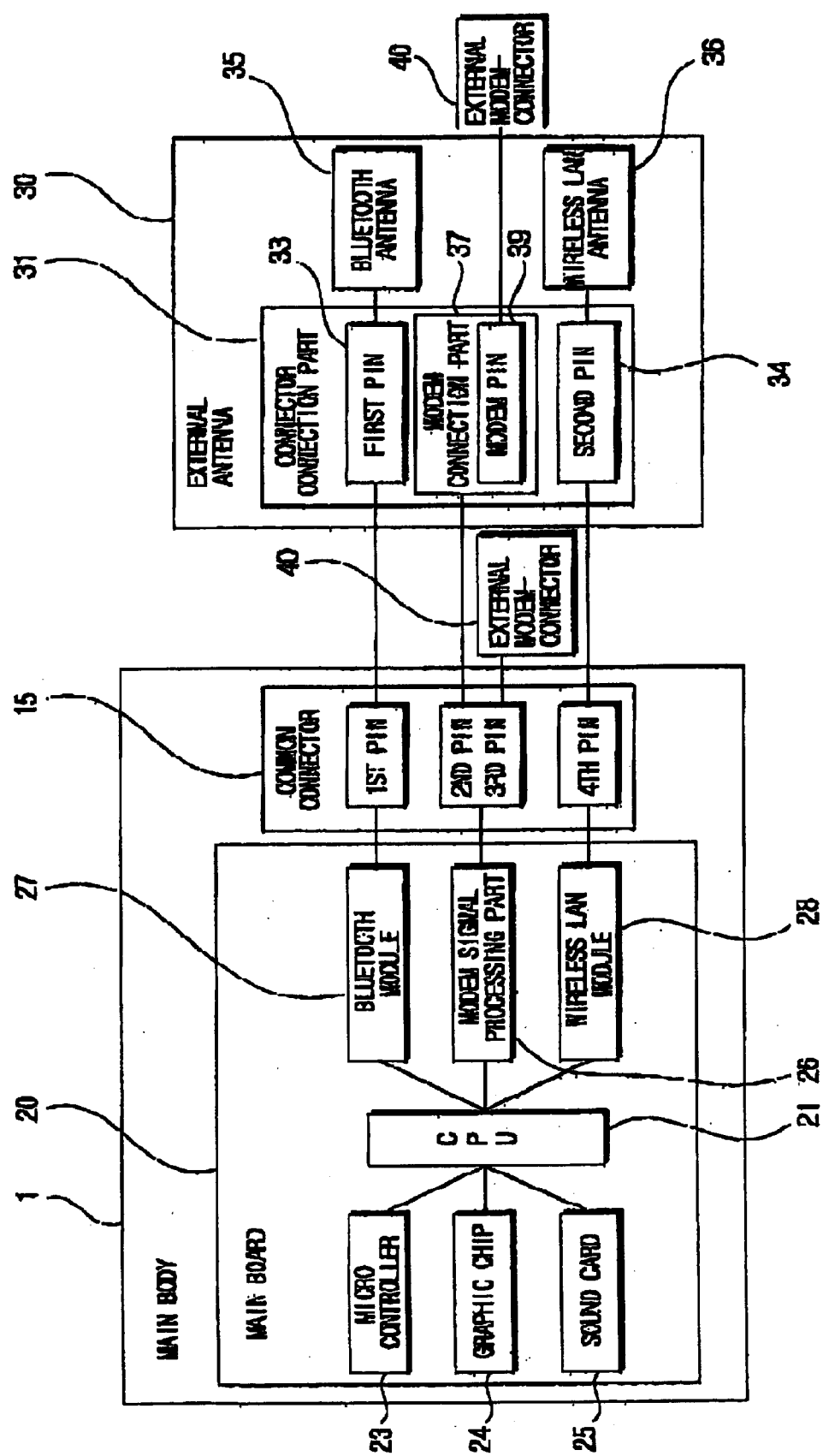
FIG. 5 is a block diagram illustrating a wireless network communication system of the notebook computer of FIG. 3.

FIG. 3 is a perspective view of the notebook computer according to an embodiment of the present invention. As shown in FIGS. 3 and 5, the notebook computer includes a main body 1 with a plurality of hardware components, such as a central processing unit 21, etc., and an LCD assembly 3 receiving a video signal from the main body 1 and displaying a picture corresponding to the video signal.

The main body 1 includes a casing 10 forming an external appearance, a keyboard 12, and the plurality of hardware components, such as a main board 20 mounted with the central processing unit 21 and a RAM (random access memory, not shown), etc.

As shown in FIGS. 3 and 5, on a side of the casing 10 are provided PS/2 ports 11 to which an external mouse (not shown) and an external keyboard (not shown) are attached, a CD-ROM drive (not shown) or a floppy disk drive 13, a sound jack 14 connected to a sound card 25 and outputting a sound therethrough, and a common connector 15 connected to the main board 20 and to which an external antenna 30 or an external modem-connector 40 is attached to communicate with external devices.

Figure 4:
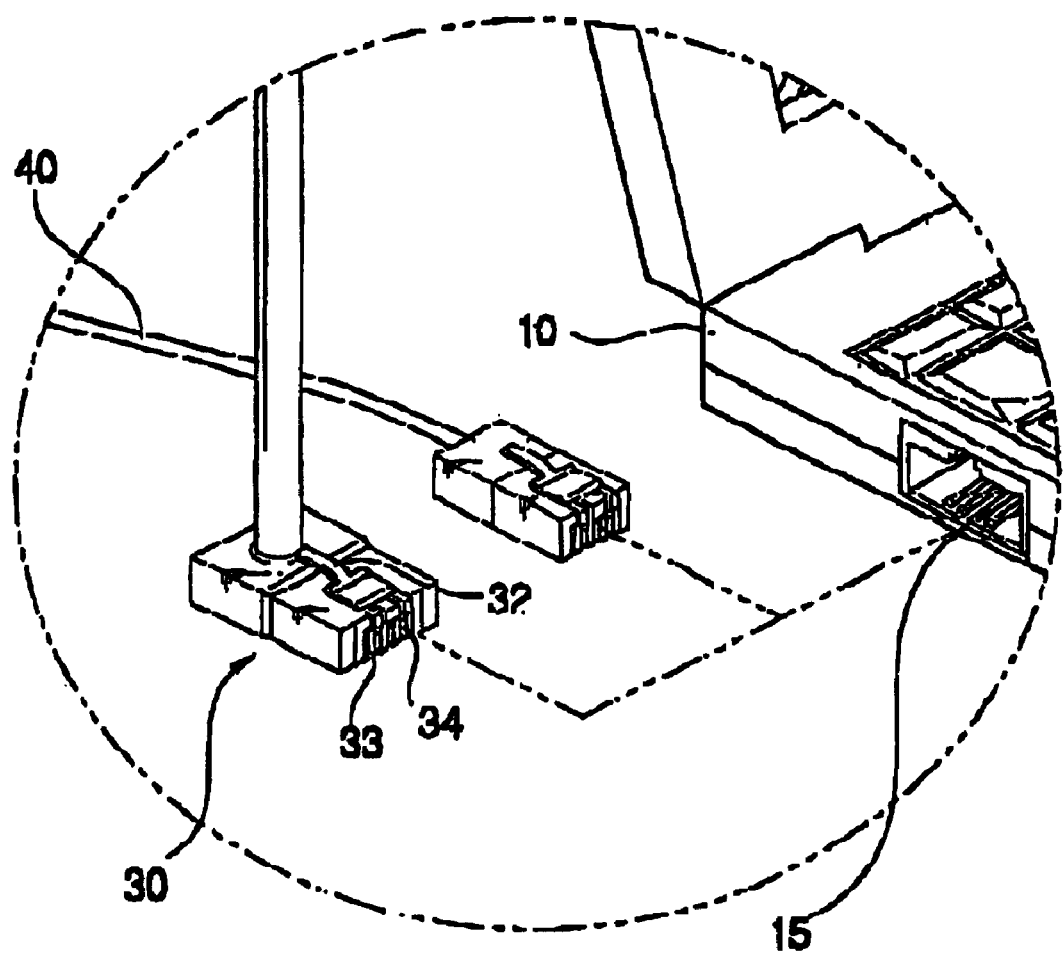
FIG. 4 is a partially enlarged perspective view of the notebook computer of FIG. 3.

As shown in FIGS. 3 and 4, the common connector 15 has 4 pins like an RJ11 connector so as to be connected to an external modem-connector 40 having 4 pins.

When the external modem-connector 40 is connected to the RJ11 connector (not shown), only two pins among four pins are employed to transmit a modem signal. More specifically, $1^{st}$, $2^{nd}$, $3^{rd}$ and $4^{th}$ pins of the RJ11 connector are in contact with $1^{st}$, $2^{nd}$, $3^{rd}$ and $4^{th}$ pins of the external modem-connector 40, respectively, but only the $2^{nd}$ and $3^{rd}$ pins are employed for transmitting the modem signal because the external modem-connector 40 has only two terminals.

Similarly, as shown in FIG. 5, $2^{nd}$ and $3^{rd}$ pins of the common connector 15 are electrically connected to a modem signal processing part 26 of the main board 20, so that the modem signal from the external modem-connector 40 is transmitted to the modem signal processing part 26. On the other hand, $1^{st}$ and $4^{th}$ pins of the common connector 15 are electrically connected to a Bluetooth module 27 and a wireless LAN module 28, respectively, so that radio signals are transmitted to the Bluetooth module 27 and the wireless LAN module 28, respectively. Further, to the $1^{st}$ and $4^{th}$ pins of the common connector 15 are detachably connected the external antenna 30 for wireless network communication.

As shown in FIG. 5, the main board 20 includes the central processing unit 21 processing various operations such as application programs, a micro controller 23 controlling the keyboard 12, a graphic chip 24 producing a video signal according to an operation of the central processing unit 21, the sound card 25 producing an audio signal according to another operation of the central processing unit 21, a modem signal processing part 26 for network communication with a modem, and the Bluetooth module 27 and the wireless LAN module 28 for the wireless network communication.

Bluetooth technology is employed as a standard for a computer and the communication industry, replaces a cable connecting portable and/or fixed electronic devices, and makes it possible to transmit radio signals over short distances between mobile phones, notebook computers, PDAs, telephones, computers and other devices without numerous and inconvenient cable attachments. The Bluetooth module 27 is employed as a hardware component for the Bluetooth technology provided in the main board 20, and electrically connected to the external antenna 30 through the common connector 15, thereby allowing the wireless network communication.

The wireless LAN module 28 is also provided in the main board 20 and electrically connected to the external antenna 30 through the common connector 15, thereby allowing the wireless network communication.

As shown in FIGS. 4 and 5, the external antenna 30 attached to the common connector 15 includes a connector connection part 31 detachably attached to the common connector 15, a Bluetooth antenna 35 and a wireless LAN antenna 36 each directing inputted radio signals to the Bluetooth module 27 and the wireless LAN module 28 through a first pin 33 and a second pin 34, respectively, and a modem connection part 37 provided in the connector connection part 31 and to which the external modem-connector 40 is hooked up.

As shown in FIG. 4, the connector connection part 31 includes a push part 32 provided in an upper part of the connector connection part 31 to allow the external antenna 30 to be easily attached to and detached from the common connector 15, and the first pin 33 and the second pin 34 each connected to the Bluetooth module 27 and the wireless LAN module 28 through the $1^{st}$ pin and the $4^{th}$ pin of the common connector 15, respectively.

As shown in FIG. 5, the first pin 33 has a first end connected to the Bluetooth antenna 35 and a second end coupled to the $1^{st}$ pin of the common connector 15, so that the radio signal is transmitted from the Bluetooth antenna 35 to the Bluetooth module 27 through the common connector 15. Further, the second pin 34 has a first end connected to the wireless LAN antenna 36 and a second end coupled to the $4^{th}$ pin of the common connector 15, so that the radio signal is transmitted from the wireless LAN antenna 36 to the wireless LAN module 28 through the common connector 15.

Figure 2:
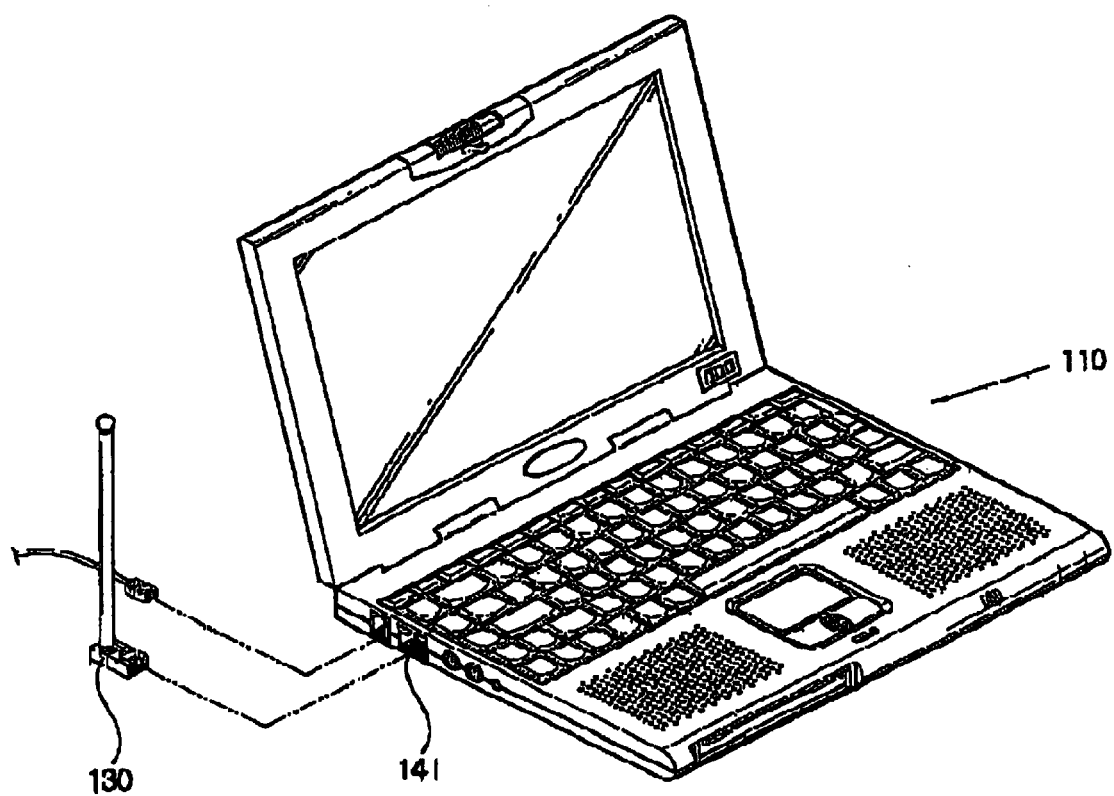

Thus, the Bluetooth antenna 35 and the wireless LAN antenna 36 are not provided inside the casing 10 of the main body 1, or the the LCD assembly 3, but provided in the external antenna 30 unlike the conventional potable computer of FIGS. 1 and 2. That is, the Bluetooth antenna 35 and the wireless LAN antenna 28 are not shielded, thereby increasing an efficiency of a radio signal transmission.

As shown in FIG. 4, the modem connection part 37 includes a modem connector 38 provided in the connector connection part 31 and to which the external modem-connector 40 is detachably attached, and modem pins 39 connected to the $2^{nd}$ and $3^{rd}$ pins of the external modem-connector 40 coupled to the modem connector 38.

The modem pins 39 are jutted from an inside of the modem connector 38 and come in contact with the $2^{nd}$ and $3^{rd}$ pins of the external modem-connector 40 inserted in the modem connector 38 of the modem connection part 37, thereby transmitting the modem signal to the $2^{nd}$ and $3^{rd}$ pins of the common connector 15.

With this configuration, the wireless network communication and the modem communication of the notebook computer according to the embodiment of the present invention are performed as follows.

To perform the wireless network communication, first, the external antenna 30 with the Bluetooth antenna 35 and the wireless LAN antenna 36 are attached to the common connector 15 by using the pushing part 32 of the connector connection part 31. The $2^{nd}$ and $3^{rd}$ pins of the common connector 15 are electrically connected to the modem signal processing part 26 of the main board 20, and the $1^{st}$ and $4^{th}$ pins of the common connector 15 are electrically connected to the Bluetooth module 27 and the wireless LAN module 28 of the main board 20, respectively. Herein, the external antenna 30 receives radio signals and transmits them to the first and second pins 33 and 34 thereof.

Then, the received radio signals are transmitted to the Bluetooth module 27 and the wireless LAN module 28 through the $1^{st}$ pin and the $4^{th}$ pin of the common connector 15. The 1st pin and the 4th pin are in contact with the first and second pins 33, 34 of the external antenna 30. Thus, the notebook computer is capable of providing the wireless network communication.

Figure 6:
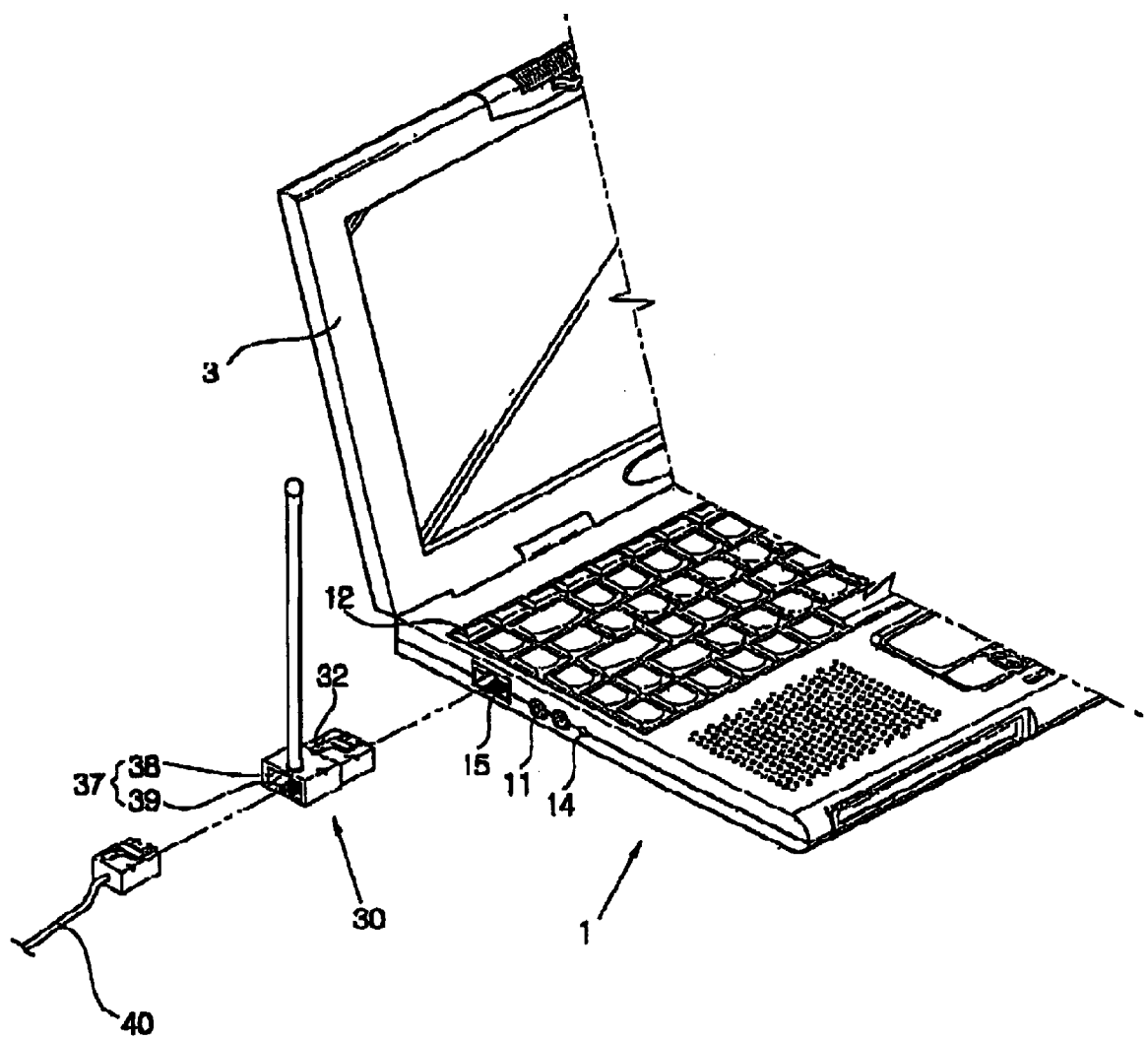
FIG. 6 illustrates an external modem-connector to be attached to a common connector of the portable computer through an external antenna according to another embodiment of the present invention.

To perform the modem communication, the external modem-connector 40 is, as shown in FIG. 6, inserted to the modem connector 38 of the modem connection part 37 provided in the connector connection part 31 of the external antenna 30. Then, the 2nd and 3rd pins of the external modem-connector 40 come in contact with the modem pins 39 jutted from the inside of the modem connector 38 of the modem connection part 37, thereby transmitting the modem signal to the modem signal processing part 26 through the 2nd and 3rd pins of the common connector 15. Thus, the notebook computer is capable of providing the modem communication, and the external modem-connector can be hooked up to the main body 1 without removing the external antenna 30.

On the other hand, the embodiment of the present invention can be implemented into a laptop computer, a palm computer, PDA, etc.

In the above-described embodiment, the external antenna 30 includes the connector connection part 31 provided with the modem connection part 37 having the modem connector 38 and the modem pins 39. However, the modem connection part 37 may be provided in the common connector 15 so as to be directly connected to the external modem-connector 40, or the external antenna 30 may be not provided with the modem connection part 37, if necessary.

In the above-described embodiment, the RJ11 connector is employed as the common connector 15. However, the common connector may have various shapes common to the external modem-connector and the external antenna.

In the above-described embodiment, both the Bluetooth module 27 and the wireless LAN module 28 are provided in the main board 20 and are employed as the wireless network communication module. However, one of the Bluetooth module 27 and the wireless LAN module 28 may be provided in the main board 20. Further, various wireless network communication modules can be employed besides the Bluetooth module 27 and the wireless LAN module 28. In this case, the external antenna 30 should include antennas corresponding to the various wireless network communication modules.

As described above, the common connector is common to both the external modem-connector, through which the modem signal is transmitted to the modem signal processing part, and the external antenna through which the radio signal is transmitted to the wireless network communication module. The external modem-connector is connected to the modem signal processing part through the external antenna, so that the radio signal becomes relatively noiseless, and an external antenna is connected to a main body without an additional device occupying the outside space of the main body where another hardware components can be installed.

As described above, the present invention provides a portable computer which has good efficiency of radio signal transmission, and leaves an installation space for another hardware components.

Although a few preferred embodiments of the present invention have been shown and described, it would be appreciated by those skilled in the art that changes may be made in this embodiment without departing from the principles and sprit of the invention, the scope of which is defined in the claims and their equivalents.

What is claimed is:

1. A portable computer having a main body provided with a modem signal processing part and a wireless network communication module, comprising:
   an external modem connector through which a modem signal is transmitted for a modem communication with the modem signal processing part;
   an external antenna through which a radio signal is transmitted for a wireless data communication with the wireless network communication module; and
   a common connector mounted in the main body to couple the external modem-connector to the modem signal processing part and the external antenna to the wireless network communication module,
   wherein the common connector is externally exposed with respect to the main body and is shaped such that:
      the external modem connector is detachably connectable to the common connector when the external antenna is not coupled to the common connector, and
      the external antenna is detachably connectable to the common connector when the external modem connector is not coupled to the common connector.

2. The portable computer according to claim 1, wherein the external antenna comprises one of a Bluetooth antenna and a wireless LAN antenna.

3. The portable computer according to claim 1, wherein the external antenna comprises:
   a connector connection part detachably attached to the common connector;
   a signal receiving and transmitting part receiving and transmitting the radio signal to the wireless network communication module of the main body, and
   a modem connection part provided in the connector connection part and inserted into the common connector to be coupled to the external modem-connector therein to transmit the modem signal from the external modem-connector to the modem signal processing part of the main body.

4. The portable computer according to claim 3, wherein the external antenna comprises one of a Bluetooth antenna and a wireless LAN antenna.

5. The portable computer according to claim 1, wherein the common connector comprises an RJ11 connector.

6. The portable computer according to claim 5, wherein the external antenna comprises one of a Bluetooth antenna and a wireless LAN antenna.

7. A portable computer having a main body provided with a modem signal processing part and a wireless network communication module, comprising:
   an external modem connector transmitting a modem signal for a modem communication;
   an external antenna transmitting a radio signal for a wireless data communication; and
   a common connector having a first terminal coupled to the wireless network communication module and second and third terminals coupled to the modem signal processing part such that, when the external modem connector is coupled to the common connector, the external modem connector transmits the modem signal to the modem signal processing part through the second and third terminals, and when the external antenna is coupled to the common connector, the external antenna transmits the radio signal to the wireless communication module through the first terminal,
   wherein the common connector is externally exposed with respect to the main body and is shaped such that:
      the external modem connector is detachably connectable to the common connector when the external antenna is not coupled to the common connector, and the external antenna is detachably connectable to the common connector when the external modem connector is not coupled to the common connector.

8. The portable computer according to claim 7, wherein the common connector comprises a fourth terminal, and the external antenna comprises a first pin and a second pin coupled to the first and fourth terminals when the external antenna is coupled to the common connector.

9. The portable computer according to claim 8, wherein the second and third terminals are disposed between the first and fourth terminals.

10. The portable computer according to claim 8, wherein the first and fourth terminals are spaced-apart from each other by a distance while the second and third terminals are disposed between the first and fourth terminals, and the first and second pins of the external antenna are spaced-apart from each other by the distance.

11. The portable computer according to claim 7, wherein the external antenna comprises one of a Bluetooth antenna and a wireless LAN antenna, and the first terminal of the common connector is coupled to the one of the Bluetooth antenna and a wireless LAN antenna of the external antenna when the external antenna is coupled to the common connector.

12. The portable computer according to claim 7, wherein the external antenna comprises modem pins coupled to the second and third terminals of the common connector when the external antenna is coupled to the common connector.

13. The portable computer according to claim 12, wherein first ends of the modem pins are coupled to the second and third terminals while second ends of the modem pins are coupled to the external modem connector.

14. The portable computer according to claim 13, wherein the external modem connector is coupled to the modem pins of the external antenna while the external antenna is coupled to the common connector.

15. The portable computer according to claim 14, wherein the external modem connector is coupled to the second and third terminals of the common connector through the modem pins of the external antenna.

16. The portable computer according to claim 13, wherein the external modem comprises a first side facing the common connector and a second side facing the external modem connector.

17. The portable computer according to claim 16, wherein the first ends of the modem pins are jutted to the first side, and the second ends of the modem pins are jutted to the second side.

18. The portable computer according to claim 16, wherein the modem pins are coupled between the external modem connector and the common connector.

19. The portable computer according to claim 16, wherein the modem pins comprise two pins corresponding to the second and third terminals of the common connectors.

20. The portable computer according to claim 7, wherein external modem connector and the external antenna are simultaneously coupled to the common connector.

21. The portable computer according to claim 7, wherein the external modem connector and the external antenna are coupled to the modem signal processing part and the wireless network communication module of the main body, respectively, through the same common connector.

22. The portable computer according to claim 7, wherein the external modem connector and the external antenna are exclusively coupled to the common connector.

23. A portable computer having a main body provided with a modem signal processing part and a wireless network communication module, comprising:
an external modem connector transmitting a modem signal for a modem communication with the modem signal processing part;
an external antenna transmitting a radio signal for a wireless data communication with the wireless network communication module, having modem pins coupled to the external modem connector when the external modem connector is coupled to the external antenna, and having a first pin; and
a common connector having a first terminal coupled to the wireless network communication module and second and third terminals coupled to the modem signal processing part, the modem pins and the first pin of the external antenna being coupled to the second and third terminals and the first terminal, respectively, when the external antenna is coupled to the common connector while the external modem connector is coupled to the external antenna and the common connector is shaped to be connectable to the external modem connector when the external antenna is not coupled to the common connector.

24. An external antenna coupled to a portable computer, comprising:
a first side and a second side;
modem pins disposed between and exposed to the first side and the second side;
a first pin exposed to the first side; and
a wireless antenna coupled to the first pin,
wherein the external antenna is shaped to be received at a common connector of the portable computer which is externally exposed with respect to a main body of the portable computer and is shaped such that:
an external modem connector is detachably connectable to the common connector when the external antenna is not coupled to the common connector, and
the external antenna is detachably connectable to the common connector when the external modem connector is not coupled to the common connector.

25. The external antenna according to claim 24, wherein the first and second sides, the modem pins, first pin and the wireless antenna are formed in an integrated single body.

26. The external antenna according to claim 24, wherein the wireless antenna is one of a Bluetooth antenna and a wireless LAN antenna.

27. The external antenna according to claim 24, wherein the wireless antenna is not shielded to increase a radio signal transmission.

28. The external antenna according to claim 24, wherein the first side and the second side are opposite to each other.

29. The external antenna according to claim 24, further comprising a second pin disposed adjacent to the modem pins opposite to the first pin, and the wireless antenna comprises two different wireless antennas coupled to the first and second pins, respectively.

30. The external antenna according to claim 29, wherein the two different wireless antennas are a Bluetooth antenna and a wireless LAN antenna.

31. The external antenna according to claim 29, wherein the two different wireless antenna are not shielded to increase a radio signal transmission.

32. The external antenna according to claim 29, wherein the modem pins are disposed between the two different wireless antennas.

33. The external antenna according to claim 29, wherein:
the common connector comprises first, second, third, and fourth terminals in order, and
the modem pins are coupled to the second and third terminals while the first pins are coupled to the first terminal when the external antenna is coupled to the computer.

34. The external antenna according to claim 29, wherein the first pin and the second pin are disposed opposite side of the modem pins.

35. The external antenna according to claim 24, further comprising an external modem connector coupled to the second side of the external antenna, having two pins coupled to the modem pins.

36. The external antenna according to claim 35, wherein:
the common connector comprises three terminals, and
the modem pins are coupled to the second and third terminals while the first pins coupled to the first terminal when the external antenna is coupled to the computer.

37. The external antenna according to claim 35, wherein the second side comprises a modem connection part having a modem connector accommodating an insertion of the external modem connector.

38. The external antenna according to claim 35, wherein the modem pins are disposed in the modem connection part.

39. The external antenna according to claim 35, wherein the modem pins are coupled to the two pins when the external modem connector is coupled to the modem connection part.

40. The external antenna according to claim 35, wherein the first side is coupled to the portable computer, and the second side is coupled to the external modem connector.

* * * * *

UNITED STATES PATENT AND TRADEMARK OFFICE
CERTIFICATE OF CORRECTION

PATENT NO. : 6,814,593 B2
DATED : November 9, 2004
INVENTOR(S) : Houk Wang et al.

It is certified that error appears in the above-identified patent and that said Letters Patent is hereby corrected as shown below:

Title page,
Item [57], ABSTRACT,
Line 7, change "modern" to -- modem --.

Column 6,
Line 32, change "main body," to -- main body; --

Column 8,
Line 15, after "antenna" insert -- , --.

Signed and Sealed this

Third Day of May, 2005

JON W. DUDAS
*Director of the United States Patent and Trademark Office*